Sept. 3, 1946.  J. EVANS  2,407,000
RADIO DEVICE FOR INDICATING DOPPLER EFFECT
Filed Oct. 31, 1941
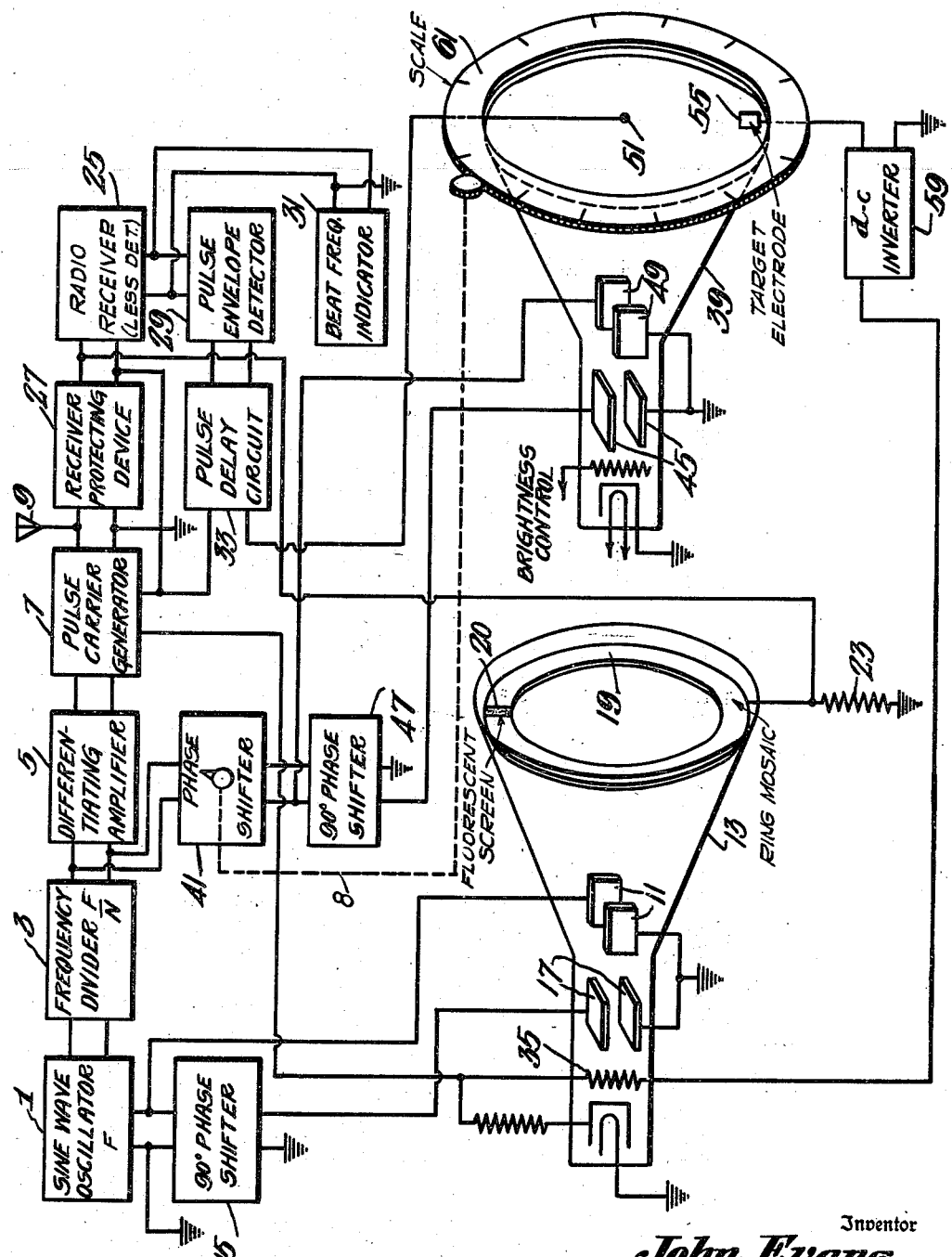
Inventor
John Evans
By
Attorney Patented Sept. 3, 1946

2,407,000

UNITED STATES PATENT OFFICE 2,407,000

RADIO DEVICE FOR INDICATING DOPPLER EFFECT

John Evans, Palmyra, N. J., assignor to Radio Corporation of America, a corporation of Delaware Application October 31, 1941, Serial No. 417,230

10 Claims. (Cl. 250—1)

This invention relates to improvements in radio devices for indicating Doppler effect, and particularly to a radio pulse-echo system in which the frequency of the carrier of the echo pulse is compared to the frequency of the carrier of the outgoing pulse which is "stored for reference purposes."

One of the difficulties in determining the change in frequency caused by the Doppler effect is to obtain a stable source of carrier or reference frequency. For example, if the outgoing pulses have a carrier frequency of the order of 500,000,000 cycles per second, or even higher, an extremely slight shift in the frequency of the carrier would be of the order of the frequency produced by the Doppler effect. The reason that the Doppler effect is so slight is that the relative rate movement of the pulse reflecting object, with respect to the pulse source, is small compared with the velocity of the radio pulses. Radio pulses travel at approximately 186,000 miles per second but, since the fastest aircraft rarely approaches a velocity of .15 mile per second, it is evident that the effect of the movement on the frequency will be very small. In other words, if the ratio of the velocities is 1,000,000 to 1, the relative movement of the pulse reflecting object and the source of the pulses has a very small effect on the apparent carrier velocity or the carrier frequency. Under such circumstances, it is essential that the carrier frequency $f$ be extremely constant, if the carrier frequency $f$ plus the Doppler frequency $\Delta$ is to be compared to the initial carrier frequency $f$.

It has been proposed to apply the outgoing pulse to a long line which is designed and terminated to reflect the pulse so that, after a suitable delay, the pulse reflected from the line is available for comparison with the pulse reflected from a distant object. While a delay line is one means for observing the Doppler effects of a pulse-echo system, the lines are relatively inefficient and are complicated by the necessity of using many sections to secure the desired delay.

The instant invention has for one object the provision of means for storing components of an outgoing radio pulse and for obtaining from the stored components a current of the initial pulse carrier frequency, which may be compared with the carrier frequency of the reflected pulse. Another object is to provide improved means for indicating the change of the carrier frequency of a pulse due to its reflection from an object moving toward or away from the pulse source. Another object is to provide improved means for indicating the velocity of movement of a pulse reflecting body toward or away from the pulse source.

The invention will be described by referring to the accompanying drawing, which is a diagram of one embodiment of the invention.

Referring to the drawing, a sine wave oscillator 1 is connected through a frequency divider 3 to a differentiating amplifier 5. The differentiating amplifier 5 is connected to a pulse carrier generator 7 which is coupled to an antenna 9. The output of the sine wave oscillator is applied directly to one pair of the deflecting elements 11 of an electronic device 13 of the cathode ray tube type. The output of the oscillator is also applied through a ninety degree phase shifter 15 to the other set of deflecting elements 17. The electronic device 13 includes a ring mosaic 19, comprising an annular ring of mica or other insulating material coated on one side with a mosaic of very small discrete spots of silver or other conductive material, and on the other side with an electrically continuous layer of conductive material. The mosaic is supported near the end of the tube with the mosaic surface facing inward. A fluorescent screen portion indicated by the reference character 20 may be provided on the face of the tube to enable visual observation of the focusing of the electron beam. The mosaic is connected to ground through a resistor 23 to provide a return path for the cathode ray beam current and act as a load resistor; variations in the beam current will cause corresponding variations in the voltage drop across the resistor.

A radio receiver device 25, which may include a first detector, a local oscillator, and an intermediate frequency amplifier, is connected through a receiver protective device 27 to the antenna 9. The device 25 could be merely a radio frequency amplifier, although the superheterodyne type circuit is preferable. The output of the device 25 is applied to a detector 29 and to a beat frequency indicator 31. The control grid 35 of the cathode ray tube is connected to the pulse generator 7. The resistor 23 is connected to the receiver device 25 to apply thereto a voltage having a frequency equal to the original carrier frequency.

A second cathode ray tube 39, which is used for distance indications, may be connected as follows: The output from the frequency divider 3 is connected through a continuously variable phase shifter 41 to one set of deflecting elements 45. The output from the continuously variable phase shifter 41 is applied through a ninety degree phase shifter 47 to the other set of deflecting elements 49. The received reflected pulse signals are applied, through a delay circuit 33 which in some instances may be omitted, to a radial deflecting electrode 51. The second cathode ray tube includes a target electrode 55. The target electrode 55 is connected through a D.-C. inverter 59 to the control grid of the storage tube. A scale 61, which may be calibrated in terms of distance, is fitted around the screen of the second tube and is mechanically coupled to the variable phase shifter 41, as schematically indicated by the dashed line 8.

The operation of the system is as follows: The currents from the sine wave oscillator 1 of, say, frequency F, which is a relatively low and easily stabilized frequency, are divided to form the pulse frequency currents of frequency $$\frac{F}{N}$$

The latter currents are applied to a differentiating amplifier 5, or its equivalent, to obtain sharply defined pulses. The sharply defined pulses key the pulse carrier generator 7. The output of the pulse carrier generator is applied to the antenna 9 from which pulses of radio energy, composed of carrier frequency components, are radiated.

The currents from the source 1 are applied directly and through the phase shifter 15 to produce a rotating field which causes the electronic beam from the gun of the electronic device 13 to trace a circular path around the mosaic ring 19. At the same time, the electronic beam scans the mosaic; the carrier frequency potentials from the generator 7 are applied to the control electrode 35 to bias on and to modulate the beam. The modulated beam applies to the mosaic charges which correspond to the carrier frequency components. Thereafter, the beam is biased off and the applied charges are stored on the mosaic.

After the initial pulse of radio energy has traveled to a pulse reflecting object and back to the antenna 9, it is amplified and detected. The detected pulse is, if necessary, suitably delayed and applied to the control electrode 35, as hereinafter described, to return the rotating electronic beam to the mosaic. This time the beam discharges the mosaic to derive therefrom currents corresponding in frequency to the carrier frequency components. The derived carrier frequency currents are of the same frequency as the carrier of the initial pulse because the sine wave oscillator 1, operating at a relatively low frequency, is extremely stable and, because if a circuit of relatively high Q (i. e. ratio of reactance to resistance), is used to control it, it is substantially invariable in frequency over the short time required for the pulse propagation. The derived carrier frequency currents are applied to the receiver device 25 and there combined with the carrier currents of the reflected pulse to form a current of difference frequency. If the frequencies of the two currents are the same, the reflecting object has no relative motion toward or away from the antenna 9. If there is a beat, or difference frequency, motion is indicated. The frequency of the beat indicates the velocity of the pulse reflecting object in the direction of the antenna. The beat frequency indicator 31 may be calibrated to indicate in miles per hour or any desired units.

Since the second cathode ray tube will respond to the received echo pulse, and since the beam scanning may be phased with respect to the initial pulse, it follows that the time of the pulse propagation will be indicated. However, as the velocity of pulse propagation is fixed at aproximately 186,000 miles per second, the second tube may be calibrated in units of distance instead of time.

The problem of indicating the velocity of a pulse reflecting object may be complicated if reflections are received from several objects located at different radial distances. To indicate the velocity of a single object, a single reflection must be selected from the plurality of reflections. The variable phasing means 41 may be used to phase the sweep of the second tube so that only the desired reflection is applied to the target electrode 55. When the beam strikes the target electrode a negative charge is built up. This charge is inverted by the D.-C. amplifier and applied to the control grid of the storage tube to bias its beam onto the mosaic to establish the carrier frequency current. Since the zero of the scale may be initially phased to correspond to the initial pulse, it follows that, as the single reflection is selected by the adjustment of the variable phasing means, the scale will be properly positioned because of its mechanical coupling to the phaser.

Thus the invention has been described as a radio pulse system for detecting the Doppler effect. The initial pulse, including its carrier frequency components, is radiated and is recorded or stored on a mosaic by a beam rotated at a relatively slow but constant angular velocity. The reflected pulse is received and is applied to release the stored pulse, which is reproduced to provide a current having the initial carrier frequency. The reproduced carrier current and the reflected carrier are combined to produce a beat frequency which is due to the Doppler effect and is a measure of the velocity of the reflecting object along the line from the object to the pulse source. The details of the oscillator, multiplier, generator, differentiating amplifier, receiver, delay circuits, phasing means, beat frequency detector and indicator, and cathode ray tubes are not shown because the details and circuits are well known to those skilled in the art.

I claim as my invention:

1. A radio pulse echo system including a source of oscillations, means connected to said source for decreasing the frequency of said oscillations, means responsive to said oscillations of decreased frequency for transmitting pulses of radio frequency energy, an electronic device including a mosaic for storing electronic charges, means including said source of oscillations for applying charges corresponding to the components of said radio frequency energy to said mosaic, a radio pulse receiver, and means connecting said receiver to said electronic device for releasing said applied charges to derive therefrom currents corresponding to the original components.

2. A radio pulse echo system including a source of oscillations, means connected to said source for decreasing the frequency of said oscillations, means responsive to said oscillations of decreased frequency for transmitting pulses of radio frequency energy, an electronic device including a mosaic for storing electronic charges, means including said source of oscillations for applying charges corresponding to the components of said radio frequency energy to said mosaic, a radio pulse receiver, delay means connecting said receiver to said electronic device for applying received echo pulses to said device for releasing said applied charges, and means for deriving from said charges currents corresponding in frequency to the original components.

3. A radio pulse echo system including a source of oscillations, means connected to said source for decreasing the frequency of said oscillations, means responsive to said oscillations of decreased frequency for transmitting pulses of radio frequency energy, an electronic device including a mosaic for storing electronic charges, means including said source of oscillations for applying charges corresponding to the components of said radio frequency energy to said mosaic, a radio pulse receiver, delay means connecting said receiver to said electronic device for applying received echo pulses to said device for releasing said applied charges, and means for comparing the frequency of the components of said received echo pulse with the frequency of said derived currents.

4. A system according to claim 2 including means for eliminating received echo pulses from objects at other than a predetermined distance.

5. A system according to claim 3 including means for eliminating received echo pulses from objects at other than a predetermined distance.

6. A radio pulse echo system including a source of oscillations, means connected to said source for decreasing the frequency of said oscillations, means responsive to said oscillations of decreased frequency for transmitting pulses including a carrier frequency, an electronic device including a mosaic for storing electronic charges, means including said source of oscillations for applying an electronic beam to said mosaic, a control electrode disposed in the path of said beam, means for applying said carrier frequency to said electrode to modulate said beam so that charges corresponding to said carrier frequency are applied to said mosaic, and means for applying to said control electrode a current for releasing said applied charges to derive therefrom currents corresponding in frequency to said carrier frequency.

7. A radio pulse echo system including a source of oscillations, means connected to said source for decreasing the frequency of said oscillations, means responsive to said oscillations of decreased frequency for transmitting pulses including a carrier frequency, an electronic device including a mosaic for storing electronic charges, means including said source of oscillations for applying an electronic beam to said mosaic, a control electrode disposed in the path of said beam, means for applying said carrier frequency to said electrode to modulate said beam so that charges corresponding to said carrier frequency are applied to said mosaic, a radio pulse receiver, and means responsive to a received reflected pulse for applying to said control electrode a current for releasing said applied charges to derive therefrom currents corresponding in frequency to said carrier frequency.

8. A system according to claim 7 including means for combining the carrier currents of the reflected pulse and the derived carrier currents to obtain a current of their difference frequency.

9. A system according to claim 7 including means for delaying the application of said received reflected pulse to said electrode.

10. A radio pulse echo system, a source of low frequency oscillations, a source of high frequency carrier oscillations, means for applying said low frequency oscillations to said carrier frequency source to create pulses of radio frequency energy, an electronic device including a mosaic for storing electric charges, means including said low frequency and high frequency sources for applying an electronic beam to said mosaic, a control electrode disposed in the path of said beam, means for applying said high frequency carrier to said electrode to modulate said beam so that charges including carrier components are applied to said mosaic, a radio pulse receiver, and means connecting said receiver to said control electrode for releasing said applied charges to derive therefrom currents corresponding to said original carrier frequency.

JOHN EVANS.